US012704861B2

(12) United States Patent
Parzysz

(10) Patent No.: US 12,704,861 B2
(45) Date of Patent: Aug. 11, 2026

(54) METHOD FOR MANAGING A VEHICLE CONTROLLED REMOTELY VIA A COMMUNICATION NETWORK, CORRESPONDING DEVICE, SYSTEM AND COMPUTER PROGRAM

(71) Applicant: Orange, Issy-les-Moulineaux (FR)

(72) Inventor: Fanny Parzysz, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 29 days.

(21) Appl. No.: 18/840,291

(22) PCT Filed: Feb. 15, 2023

(86) PCT No.: PCT/EP2023/053700
§ 371 (c)(1),
(2) Date: Aug. 21, 2024

(87) PCT Pub. No.: WO2023/156423
PCT Pub. Date: Aug. 24, 2023

(65) Prior Publication Data
US 2025/0165012 A1 May 22, 2025

(30) Foreign Application Priority Data
Feb. 21, 2022 (FR) ....................................... 2201523

(51) Int. Cl.
*G05D 1/82* (2024.01)
*G05D 1/226* (2024.01)
(Continued)

(52) U.S. Cl.
CPC ............... *G05D 1/82* (2024.01); *G05D 1/226* (2024.01); *G08G 5/59* (2025.01); *G05D 2109/20* (2024.01)

(58) Field of Classification Search
CPC ...... G05D 1/82; G05D 1/226; G05D 2109/20; G08G 5/59; G08G 5/55; G08G 5/34
See application file for complete search history.

(56) References Cited

U.S. PATENT DOCUMENTS 6,943,701 B2 * 9/2005 Zeineh .................... G08G 5/80 340/936
7,231,294 B2 * 6/2007 Bodin .................... G01C 21/20 343/705
(Continued)

FOREIGN PATENT DOCUMENTS

EP 3 598 420 A1 1/2020
FR 3 118 260 A1 6/2022
WO WO 2016/154942 10/2016

OTHER PUBLICATIONS

International Search Report for International Application No. PCT/EP2023/053700 Apr. 12, 2023.
(Continued)

*Primary Examiner* — Thomas Ingram
(74) *Attorney, Agent, or Firm* — Knobbe, Martens, Olson & Bear, LLP

(57) ABSTRACT

A method for managing a position of a remotely-controlled vehicle, referred to as a drone, relative to a control entity, the control entity being configured to control the drone by means of a stream of control data transmitted indirectly within a communication established between the control entity and the drone via a communication network, the method including: for at least one time instant of the communication, determining at least one parameter relating to a distance between the drone and the control entity; when the distance-related parameter does not lie within an interval of authorised values for a given piloting mode, applying at least one given management rule for the drone.

15 Claims, 9 Drawing Sheets

(51) Int. Cl.
*G05D 109/20* (2024.01)
*G08G 5/59* (2025.01)

(56) References Cited

U.S. PATENT DOCUMENTS

| | | | | |
|---|---|---|---|---|
| 9,870,000 | B2 * | 1/2018 | Stange | G05D 1/106 |
| 10,089,887 | B2 * | 10/2018 | Just | H01Q 3/08 |
| 10,114,384 | B2 | 10/2018 | Liu et al. | |
| 10,339,819 | B1 * | 7/2019 | Gentry | H04W 12/06 |
| 2015/0254988 | A1 * | 9/2015 | Wang | G08G 5/22 701/3 |
| 2018/0074520 | A1 | 3/2018 | Liu et al. | |
| 2020/0027358 | A1 * | 1/2020 | Fine | G08G 5/723 |
| 2020/0310408 | A1 * | 10/2020 | Carper | G01C 21/165 |
| 2020/0372811 | A1 * | 11/2020 | Lindqvist | G05D 1/0022 |
| 2022/0283580 | A1 * | 9/2022 | Chen | G05D 1/226 |
| 2022/0291677 | A1 * | 9/2022 | Jensen | G05D 1/0022 |
| 2024/0053743 | A1 | 2/2024 | Parzysz et al. | |
| 2025/0284293 | A1 * | 9/2025 | Jaisinghani | G05D 1/69 |

OTHER PUBLICATIONS

3GPP TR 23.754 v17.1.0, Study on supporting Unmanned Aerial Systems (UAS) connectivity, Identification and tracking, Mar. 2021.
3GPP TR 23.755 v17.0.0, Study on application layer support for Unmanned Aerial Systems (UAS), Apr. 2021.
3GPP TS 22.125 Unmanned Aerial System (UAS) support in 3GPP, Sep. 2020.

* cited by examiner

METHOD FOR MANAGING A VEHICLE CONTROLLED REMOTELY VIA A COMMUNICATION NETWORK, CORRESPONDING DEVICE, SYSTEM AND COMPUTER PROGRAM

CROSS-REFERENCE TO RELATED APPLICATIONS

This application is filed under 35 U.S.C. § 371 as the U.S. National Phase of Application No. PCT/EP2023/053700 entitled "METHOD FOR MANAGING A VEHICLE CONTROLLED REMOTELY VIA A COMMUNICATION NETWORK, CORRESPONDING DEVICE, SYSTEM AND COMPUTER PROGRAM" and filed Feb. 15, 2023, and which claims priority to FR2201523 filed Feb. 21, 2022, each of which is incorporated by reference in its entirety.

BACKGROUND

Field

The field of the development is that of remotely-controlled vehicles or drones. More specifically, the development relates to the monitoring, by a communications network, of the displacement, for example the flight, of a drone relative to its pilot.

Description of the Related Technology

Remotely-controlled vehicles, more commonly referred to as drones, are vehicles that are piloted remotely. This type of vehicle is increasingly used for applications as diverse as analysing transport infrastructures (railways, electricity grids, road infrastructures), producing maps or delivering products to end consumers. These drones, which are usually aerial, can also be wheeled vehicles or else used at sea. They are characterised by the fact that the pilot is not on board but at a distance from the vehicle, which is controlled by a control device. The drone can be remotely controlled by the pilot using the control device, or the drone can move autonomously, for example in accordance with the execution of a programmed displacement plan, but always under the control of the pilot, who ensures that the drone is navigated in accordance with the programmed displacement plan.

Faced with these new possibilities and the increased risks of misuse (whether intentional or not), the aviation authorities have designed an architecture, known as UTM (UAV ("Unmanned Aerial Vehicle") traffic management), and a whole range of services designed to enable safe and efficient airspace management. A key component of this architecture is the USS (UTM Service Supplier), which acts as the interface between the drone operator, for example the UAVC pilot (drone Controller) or a company that manages a fleet of drones and offers associated services (UAS Operator), the pilot/drone pair (UAS for Unmanned Aerial System) and the Aviation Authorities.

In simplified terms, a drone generates two separate streams, one for the transmission of data relating to the drone's mission (e.g. photos), known as the payload, and the other for the transmission of data relating to the piloting of the drone, control of its trajectory and air traffic management, known as the Command & Control data or C2 link.

As the pilot is not on board, this C2 link is essential as it maintains communication between the drone in the air and the UAVC pilot on the ground. Two types of drone flight can be distinguished:

- Visual Line of Sight (VLoS): the pilot is in proximity to their drone and direct communication is maintained between both (point-to-point link);
- Beyond Visual Line of Sight (BVLoS) flights: the pilot may be a long way from the drone, and communication between the two is carried via a telecommunications network (e.g. satellite or cellular).

There are many ways of establishing this C2 link between the UAV drone and the UAVC pilot.

Firstly, the link can be direct, i.e. the drone and UAVC communicate directly with each other, via a single ground-to-air radio link, without any intermediary and in particular without any intermediate communication network. These are known as "Non-Networked UAV" and "Non-Networked UAVC". This type of link is intrinsically linked to the concept of direct line-of-sight VLoS flights, as the range of this single radio link is limited by the physical characteristics of the environment and radio propagation. However, the absence of any link other than the one established between the drone and its pilot cannot establish a control link between the Aviation Authorities and the pilot, so they are neither informed in real time when the pilot does not comply with the declared flight plan, nor a fortiori are they in a position to take control of the drone to bring it back into an authorised zone. In addition to the frequency bands dedicated to aviation (which do not necessarily allow a very high bitrate), the use of other radio technologies can be envisaged to establish such a direct link. Wi-Fi wireless technology is by far the most widespread technology. Inexpensive, but with a relatively short range (no more than 1 or 2 km), the pilot, and therefore the control device, has to remain in proximity to the drone. It is regarded as reliable by the aviation authorities. Recently, new cellular technologies called "cellular V2X" (C-V2X) have been proposed to establish a direct link.

Secondly, the link can be indirect, that is the UAV and the UAVC communicate with each other via a communications network, the UAV and the UAVC are each connected to the communications network via an access point to that network, and the network (or system of networks, for example cellular network+IP network) acts as a junction between the two. The UAV connects to the network via an air-ground link based on radio technology, which can be Wi-Fi or:

- satellite technology, which is used more for military purposes, but allows drones (generally completely autonomous) to be flown beyond the direct line of sight (BVLoS mode), including at very long range (for example, in the middle of the ocean). As drones equipped with a satellite interface are relatively expensive, this technology currently represents a niche in the market and is useful in certain cases, particularly where there is no cellular network;
- cellular technology, which has a number of advantages. On the one hand, it is more reliable and much more secure than Wi-Fi, and on the other, it is cheaper and much more accessible than satellite. In addition, this technology benefits from the national coverage of telecoms operators or MNOs (Mobile Network Operators), as well as the intrinsic means to control the drone remotely while ensuring a high data rate for the transmission of payload data linked to the drone's mission.

If there is a cellular connection between the drone and the network, this is known as a networked UAV.

The UAVC can connect to the network via wireless technology (WiFi, Cellular, Satellite, etc.) or wired technology (ADSL, optical fibre, etc.). There are two main cases:

1) "Networked UAVC", for a pilot using an item of 3GPP terminal equipment such as a smartphone and connected to the communications network via conventional cellular radio technology (not "C-V2X");
2) "Cloud UAVC", for a pilot connected via an access technology (wired or wireless) other than conventional cellular radio technology and passing via an interconnection network, for example of the Internet type, before joining the cellular network and reaching their drone, of the "Networked UAV" type.

The indirect link between the UAV and the UAVC offers a number of advantages, as it enables a whole range of services to be deployed (on the network or via external entities connected to this network, such as the USS) to improve control of drone operations, for example, checking flight authorisations, ensuring that declared flight zones are respected, regaining control of the drone, etc. For a networked UAV, the 3GPP organisation has proposed solutions to ensure a degree of control over the zone actually flown over by the drone, using cellular technologies. For example, they are described in document TR 23.754 "Study on Supporting Unmanned Aerial Systems (UAS) Connectivity, Identification and Tracking", version 17, published by 3GPP in March 2021 (solutions 13, 14 and 15).

These solutions include:

the 3GPP system implemented in the cellular network to associate a UAV with a UAVC (registration, identification, authorisation, etc.);

the UTM/USS to access the geolocation of the UAV and/or UAVC, by simple request or periodically, via the radio coverage of the cellular network;

the UTM/USS to verify these positions, and potentially to request the revocation of the authorisation of a UAV if this one deviates from its trajectory or its declared zone;

the 3GPP system to compare a UAV position with a trajectory provided by the UTM/USS, which can then request a change of trajectory or send an alert.

In particular, three tracking modes for the UAV are specified, based on a Network Exposure Function (NEF) and 5GC event exposure characteristics, which enable interaction between the mobile operator's network and a third party/customer, by collecting a certain amount of data using APIs, processing this data and then exposing it to third parties. The entities involved in the displacement of the drones can therefore provide information to the cellular network concerning:

1) UAV Location Reporting (transmission of position on request or periodically);
2) UAV Presence Monitoring Mode (alert when a targeted UAV moves outside a geographical zone);
3) List of airborne units (UAVs) present in a given geographical zone.

However, existing solutions based on an indirect link for C2 communications (including the solutions proposed at the 3GPP) are essentially suited to use in BVLoS mode, as they remove any notion of distance between the UAV and the UAVC and do not guarantee that the drone remains close to its UAVC, whatever the flight zone declared to the aviation authorities. In addition, the position of a UAV or a UAVC cannot be checked other than on the basis of a predefined trajectory or overflight zone provided by the UTM/USS. As a result, despite the many advantages of cellular technology and the strong demand from drone operators for this technology, this technology is still not authorised by the aviation authorities for the transmission of control data using the C2 link. Since the link between the UAV and the UAVC is not direct, cellular technology is naturally associated with BVLoS mode flight, and we can assume that the aviation authorities fear that such flights will become widespread. However, the deployment of unmanned drones in close proximity could become complicated to manage, both in the event of incidents (e.g. how to manage a crash remotely) and in terms of authorisations and checks by law enforcement agencies (e.g. how to check flight authorisations).

There is therefore a need for a technique to monitor the flight of a drone using an indirect link with its pilot, and in particular to ensure that it remains in direct line of sight for its pilot.

The development improves the situation.

SUMMARY

The development responds to this need by proposing a method of managing a position of a remotely-controlled vehicle, known as a drone, relative to a control entity, said control entity being configured to control the drone by means of a control data stream transmitted indirectly within a communication established between the control entity and the drone via a communication network, said method comprising:

for at least one time instant of the communication, determining at least one parameter relating to a distance between the drone and the control entity;

when the distance-related parameter does not lie within an interval of authorised values for a given piloting mode. applying at least one management rule for the drone.

In this document, a drone control entity is understood to mean a drone control device, a drone pilot, whether a human being or an automatic pilot, or a pair consisting of a pilot and a drone control device, the control entity and its drone being connected together by an indirect link, i.e. via a communications network, for example a mobile network or a satellite network or a network of networks, such as for example a mobile network interconnected with a data network, such as the Internet, the drone being connected to the mobile network, for example by cellular radio, and the control entity being connected to the data network by Wi-Fi radio, or by any wired link.

In this context, as the drone and its control entity are not connected by a point-to-point link, the drone's displacement is not limited by any radio range beyond which it would lose connection with its pilot.

Although in the following we will focus more specifically on the case of a drone, the development naturally applies to all types of remotely controlled devices, whether flying, rolling or floating.

The development proposes a completely new and inventive approach to managing the position of a drone relative to its pilot, based on determining a parameter relating to a distance between the drone and its pilot and on verifying that the value of this parameter remains within a range of authorised values for a given piloting mode. If this is not the case, one or more drone management rules are applied to bring the drone close enough to its pilot or to change the way the drone is used.

Advantageously, this determination of a distance parameter is repeated several times during the journey, making it possible to track the displacement of the drone relative to its pilot and to correct the situation if the drone does not comply with the mutual distance constraints set beforehand.

Distance-related parameter refers here both to a physical measurement between the geographical positions of the drone and its control entity at a given time, and a measurement of the latency of a data signal transmitted between the two, such as the control data stream, for example, or any other measure of the quality of the communication established between the two and which deteriorates as the physical distance between the drone and its pilot increases, such as, for example, a measure of the signal-to-interference ratio and noise between the drone and the access station to which the drone is connected and which can help to assess the distance between the drone and the control entity.

In this way, the development makes it possible to guarantee both a manual piloting mode along a direct line of sight, when the distance parameter is a physical distance measurement and the associated distance interval is limited by the direct line of sight distance commonly accepted by the Aviation Authorities (in the order of 200 to 300 m), an automatic piloting mode, when the distance parameter in question provides information about the quality of service of the connection between the drone and the control entity or is calculated from a latency measurement of the control data stream exchanged between the drone and its pilot.

The development can be implemented either in one or more entities or functions of the communication network, for example an entity of a drone connectivity management system integrated into this network, in the case of a cellular network as described by the 3GPP, or in a system connected to said network, such as for example a UTM/USS drone traffic management system managed for example by the Aviation Authorities and configured to interact with the preceding system.

The development thus relies on the infrastructure of a communications network via which a pilot is connected to their pilot to monitor in real time that the drone's displacement satisfies the conditions laid down by the Aviation Authorities and to intervene if this is not the case.

According to one aspect of the development, the method further comprises obtaining a geographical position of the drone and a geographical position of the control entity, said parameter comprises at least one physical distance measurement between the drone and the control entity determined from said geographical positions and said at least one management rule is applied when said distance measurement exceeds a maximum authorised distance).

Advantageously, the restrictive measures are applied as soon as the drone leaves an authorised geographical zone centred on the geographical position of the control entity and within a radius equal, for example, to the direct line of sight distance commonly accepted by the aviation authorities.

The development proposes to analyse the successive geographical positions of a drone relative to those of its pilot, enabling it to carry out dynamic geofencing of the drone and to trigger alerts or restrictive actions as soon as the virtual boundary of a displacement zone authorised by the piloting mode is crossed.

Thus, according to this embodiment of the development, the control entity becomes an anchor point for detecting a deviation of the displacement of the drone relative to given rules set for the piloting mode that marks the drone-control entity association.

When it is determined that the drone has exceeded the authorised distance limit, one or more management rule measures, corresponding, for example, to restrictive displacement rules, are applied with the aim, for example, of bringing the drone into closer proximity to its control entity.

For example, for a VLOS piloting mode, in direct line of sight, the development makes it possible in particular to guarantee the principle of flight in "direct line of sight" and thus to reproduce, in the case of an indirect link between the drone and its pilot, this characteristic of a drone flight in VLOS mode based on point-to-point radio technology, for example Wi-Fi.

According to another aspect of the development, said parameter relating to a distance comprises at least one latency measurement of the communication established between the drone and the control entity and said at least one drone management rule is applied when said latency measurement is greater than a maximum latency value.

Advantageously, this is an end-to-end latency measurement. It detects when the quality of communication between the drone and the control entity deteriorates. For example, when the control entity is an autopilot integrated into a remote computer system close to a first base station, of the MEC type, a latency measurement that is too high may mean that the drone has moved too far away from the first base station and that it is time to transfer control of the drone to another autopilot closer to the second base station.

According to yet another aspect of the development, the method comprises first obtaining a classification model of a neighbourhood of the control entity associated with the given piloting mode, said model comprising at least a first zone, called authorised displacement zone, defined by said interval of values of the parameter, and a second non-authorised displacement zone, complementary to the first, and said at least one drone management rule is applied when the drone leaves the authorised displacement zone.

This neighbourhood classification model can be associated by default with a given piloting mode. For example, for a VLOS line-of-sight piloting mode, the authorised zone is defined by the line-of-sight distance commonly accepted by the Aviation Authorities.

According to another aspect of the development, the method comprises obtaining information relating to a declared displacement zone for the drone 10, said authorised displacement zone is adapted according to the declared displacement zone and said at least one drone management rule is applied when the drone leaves the authorised displacement zone or the declared zone.

Advantageously, when the pilot has declared a zone of displacement or overflight or flight plan, this information is obtained by the network and used to define the authorised geographical zone more precisely. In other words, the drone must be both within the declared zone and within the interval of values for the distance parameter.

According to yet another aspect of the development, the method comprises obtaining the given piloting mode beforehand, said piloting mode being stored in memory for an association between the drone and the control entity in said network.

According to the development, the association between the drone and the control entity, which must be authorised by the Aviation Authorities before flight, is marked by a given piloting mode. This marking then conditions the monitoring the drone-control entity system during the flight. For example, the piloting mode is stored in connection with an identifier of the drone and an identifier of the control entity or in connection with an identifier of the association between the drone and the control entity.

One advantage is that the piloting mode is recorded during the association procedure between the drone and its pilot. One advantage is that it is grafted onto the association procedure already specified by 3GPP and reuses existing message exchanges.

The piloting mode can be line-of-sight or VLOS, suitable for a manual pilot. For an autopilot, a "LAT" piloting mode linked to latency constraints is more suitable.

According to another aspect of the development, said at least one drone management rule belongs to a group comprising at least the sending to the control entity of a notification relating to:

- a warning that the drone has left at least the authorised flight zone;
- a command to return to the authorised flight zone;
- a flight plan to the authorised flight zone;
- a notification that control of the drone has been transferred to a second control entity.

Such measures are injunctions. They are intended to inform the pilot of the situation and the risks involved.

According to yet another aspect of the development, said at least one drone management rule comprises triggering a transfer of control of the drone to a second authorised control entity.

The second control entity must have drone control authorisation issued by a UTM drone traffic management system and must have previously connected to the mobile telecommunications network.

One advantage of such a measure is that it is coercive. For example, it could be implemented, but not necessarily when warning incentives have failed.

Advantageously, said transfer of control of the drone to the second control entity triggers an update of the piloting mode, the authorised interval of values and the at least one drone management rule.

Like the first control entity, the second control entity can be marked by a "VLOS" piloting mode, but it can also be mandated by the aviation authorities or be an autopilot of the mobile telecommunications network and be marked by a "LAT" piloting mode, linked to communication latency constraints between the drone and its autopilot.

Advantageously, the change of control entity can also trigger a new classification model associated with the second control entity for the second piloting mode.

According to yet another aspect of the development, said at least one management rule comprises the transmission of an order prohibiting attachment of the drone to at least one item of access equipment located within radio range of the unauthorised zone.

One advantage is that it is possible to delimit the unauthorised zone by making it technically impossible for the drone to cross a certain limit.

According to another aspect of the development, said at least one drone management rule comprises the transmission to at least one item of access equipment located within radio range of said unauthorised geographical zone, of an order of degradation of a signal quality between the drone and said at least one item of access equipment of said network.

One advantage is that it simulates the drop in radio signal quality in the case of a point-to-point radio link, which the pilot is used to seeing as an alert and associating with the drone moving too far away from its pilot (leaving the radio range zone).

Advantageously, this order of degradation can be limited to the useful data stream and not affect the control data stream.

According to yet another aspect of the development, the method comprises obtaining an event report and transmitting said report to an accredited entity and/or to the control entity.

These include, for example, the UTM/USS drone traffic management system and the Aviation Authorities. One advantage is that the development enables them to access information relating to the drone's displacement automatically and shortly after the flight, which is not currently the case when the control entity is connected to the drone via a point-to-point radio link.

The development also relates to a device for managing a position of a remotely-controlled vehicle, referred to as a drone, relative to a control entity, said control entity being configured to control the drone by means of a stream of control data transmitted indirectly within a communication established between the control entity and the drone via a communication network.

Said device is configured to implement:

- for at least one time instant of the communication, determining at least one parameter relating to a distance between the drone and the control entity;
- when the distance-related parameter does not lie within an interval of authorised values for a given piloting mode, applying at least one management rule for the drone.

Advantageously, said management device is implemented by one or more entities or functions of a system for managing the connectivity of drones integrated into the communication network. Advantageously, said management device and said connectivity management system of the drones are included in a system for managing a position of a remotely-controlled vehicle, referred to as a drone, relative to a control entity configured to control it by means of a communication session established in a telecommunications network. Said management system also comprises a drone traffic management system which is connected to said network.

The management system and the management device have at least the same advantages as those conferred by the above-mentioned management method.

The development also relates to a computer program product comprising program code instructions for implementing respectively the management method as described previously, when it is executed by a processor.

A program can use any programming language, and can be in the form of source code, object code, or intermediate code between source code and object code, such as in a partially compiled form, or in any other desirable form.

The development also relates to at least one computer-readable storage medium on which is saved a computer program comprising program code instructions for implementing the steps of the method according to the development as described above.

Such a storage medium can be any entity or device able to store the program. For example, the medium can comprise a storage means, such as a ROM, for example a CD-ROM or a microelectronic circuit ROM, or a magnetic recording means, for example a mobile medium (memory card) or a hard disk or SSD.

On the other hand, such a storage medium can be a transmissible medium such as an electrical or optical signal, that can be carried via an electrical or optical cable, by radio or by other means, so that the computer program contained therein can be executed remotely. The programs according to the development can be downloaded in particular on a network, for example the Internet network.

Alternatively, the storage medium or media can be one or more integrated circuits in which the program is embedded, the circuit(s) being adapted to execute or to be used in the execution of the above-mentioned method(s).

According to an embodiment, the present technique is implemented using software and/or hardware components. In this context, the term "module" may be used in this document to refer to a software component, a hardware component or a combination of hardware and software components.

A software component is one or more computer programs, one or more subroutines of a program, or more generally any element of a program or software capable of implementing a function or set of functions, as described below for the module concerned. Such a software component is executed by a data processor of a physical entity (terminal, server, gateway, set-top-box, router, etc.) and is able to access the hardware resources of this physical entity (memories, recording media, communication buses, electronic input/output cards, user interfaces, etc.). Hereafter, resources are understood to be any set of hardware and/or software elements that support a function or service, whether individually or in combination.

In the same way, a hardware component is any element of a hardware assembly capable of implementing a function or set of functions, as described below for the module concerned. It may be a programmable hardware component or a component with an embedded processor for executing software, for example, an integrated circuit, a smart card, a memory card, an electronic card for executing firmware, etc.

Each component of the system described above naturally implements its own software modules.

The various embodiments mentioned above can be combined with each other for the implementation of the present technique.

BRIEF DESCRIPTION OF THE DRAWINGS

Other purposes, features and advantages of the development will become more apparent upon reading the following description, hereby given to serve as an illustrative and non-restrictive example, in relation to the figures, among which.

DETAILED DESCRIPTION OF CERTAIN ILLUSTRATIVE EMBODIMENTS

The general principle of the development is based on determining, in particular during the displacement of a drone, a distance-related parameter between this drone and its control entity, connected to each other by an indirect link, and on applying drone management rules, comprising for example measures to restrict the displacement of the drone, when this parameter takes a value which does not belong to an interval of values authorised for a given piloting mode.

The drone and its control entity, and possibly their association, are subject to prior authorisation by the Aviation Authorities. Advantageously, the drone and/or its control entity and/or their association is marked, prior to displacement, by the given piloting mode and this marking conditions the monitoring of the displacement of the drone with respect to its control entity according to the development.

In a particular embodiment, the parameter determined is a physical distance measurement obtained from readings of the geographical positions of the drone and the control entity, and the application of displacement restriction measurements is triggered when this distance measurement exceeds a given threshold.

For example, the piloting mode is the VLOS line-of-sight piloting mode, the given threshold is set to the maximum line-of-sight distance commonly accepted by the Aviation Authorities.

The development thus makes it possible to monitor that a drone and its pilot comply with the conditions for flight in VLOS mode and to act when this is not the case to bring the drone back into proximity with its pilot.

The restrictive measures can be both incentive-based, for example taking the form of alerts sent to the control entity, and coercive, for example leading to a change in the connection of the drone and the control entity to the telecommunications network or a change in the flight plan or a transfer of control of the drone. Advantageously, they can be taken in stages during the flight depending on the pilot's reactions to measures taken previously.

In the following, embodiments of the development in a mobile telecommunication network, whose architecture complies with the 3GPP standard (in one of its current or future versions) and implements radio access functions, for example, of the base station type, and functions/network core, for example NEF or UPF (User Plane Function) is described in more detail. Note that according to the 3GPP 5G standard, a mobile network consists of physical and/or virtual network functions PNF/VNF that are interconnected and may belong to the access and/or core part of the communication network.

Figure 1A:
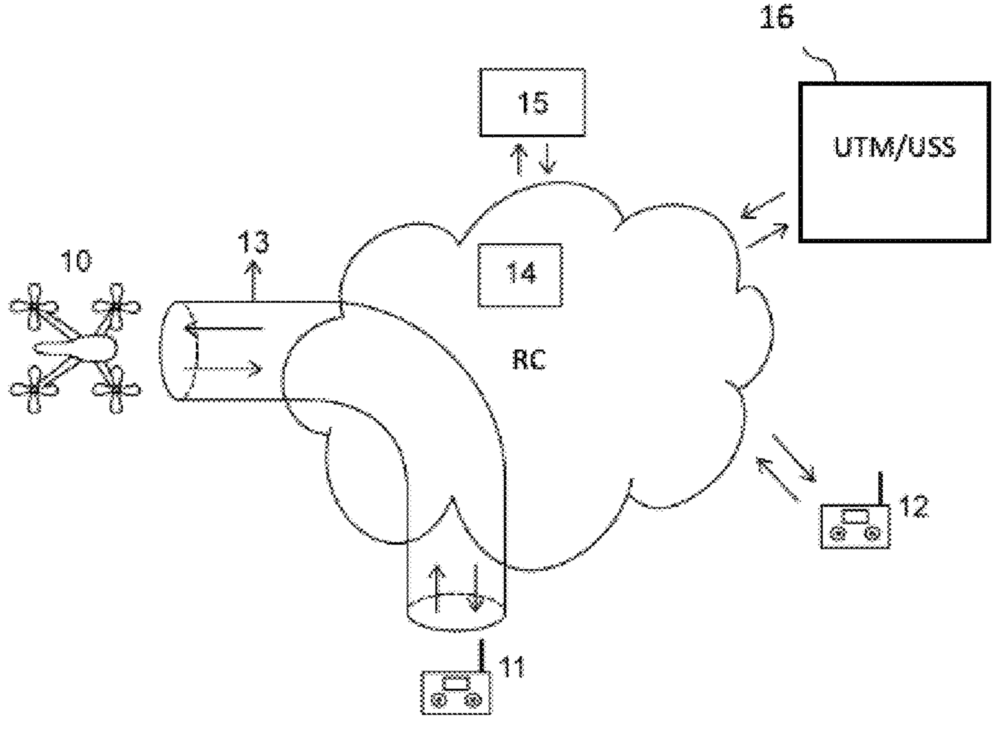
FIG. 1A: this figure shows the various elements involved in implementing the present solution, for a drone and a control entity connected to each other via a communication network.
Figure 1B:
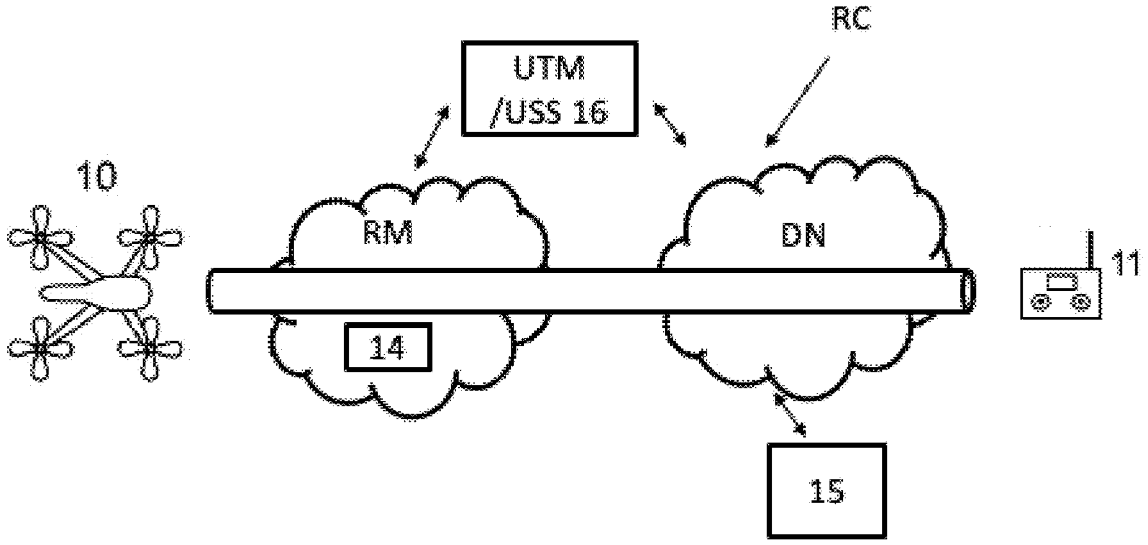
FIG. 1B: this figure details the various elements involved in implementing the present solution, when the control entity of the drone is connected to the communication network via a data network.

In relation to FIG. 1A and FIG. 1B, the various elements involved in implementing the present solution are now presented.

Hence, a remotely-controlled vehicle 10, such as a drone for example, is about to set off on a mission, during which it will be controlled by a first control entity 11. Such a drone 10 belongs to a fleet of drones managed by a drone operator, or management entity 15 of a drone fleet. An example of a management entity 15 of a drone fleet is a home delivery company or an industrial site surveillance company.

In the embodiment shown in FIG. 1A, such a control entity 11 is configured to exercise control over the drone 10, by exchanging a control data stream by means of a communication 13 established between the drone 10 and the control entity 11 via the communication network RC. The data stream is bidirectional: The pilot sends commands, such as direction, and the drone transmits its flight parameters, GPS position, etc. to the pilot. This communication is supported, for example, by one or more transmission channels established between the control entity 11 and the drone 10. The establishment and maintenance of this communication is carried out by network RC entities, which implement a certain number of additional functionalities specific to the management of the connectivity of remotely controlled systems in an SGC system 14. For example, the drone 10 and the control entity 11 are identified to the SGC system 14.

It is assumed that drone 10 is connected to the network RC by cellular radio access. The UAVC control entity 11 may also be connected via a cellular radio access, as in the example shown in FIG. 1A, in which case the network RC may be a mobile network, or it may be connected to the network RC via another access network, for example a data network (DN), as shown in FIG. 1B. In this second case, the network RC is a network of networks comprising the mobile network RM and the data network DN, which may be a wired (fibre, xDSL) or wireless network.

Such an SGC system 14 for managing the connectivity of remotely controlled systems is, for example, a system such as that described in the 3GPP TR 23.754 V2.0.0 publication: Study on supporting Unmanned Aerial Systems (UAS) connectivity, Identification and tracking (Release 17)—November 2020, already cited. This document describes several solutions for the control of a drone by a control entity via a communication established in a communications network, which involve different equipment, entities or functions of the communications network, which will not be systematically detailed in what follows.

The SGC system 14 communicates with a drone traffic management UTM/USS system 16, itself connected to the communication network RC. A UTM/USS system 16 of this kind manages drone traffic in order to limit and even avoid accidents between drones or with other vehicles, whether remotely controlled or not. To this end, the drone traffic management UTM/USS system 16 is authorised to issue displacement authorisations to the drone 10 and control authorisations to the control entities 11, 12. This means that only an authorised drone 10 can carry out a mission. Similarly, only an authorised control entity 11, 12 can exercise control over a drone. This system 16 is connected to a communication network RC.

Figure 2:
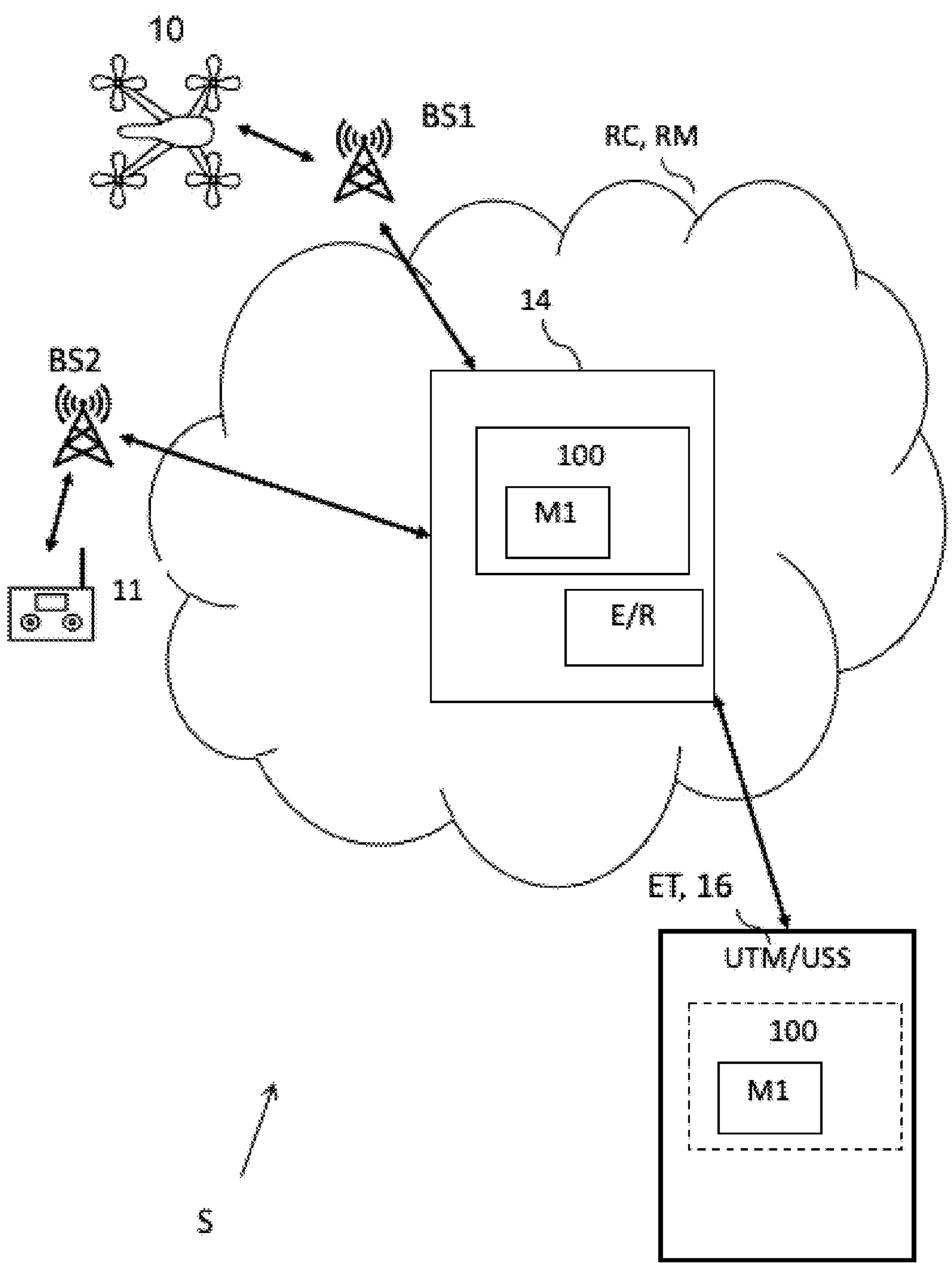
FIG. 2: this figure shows an illustrative example of the architecture of a system for managing a remotely-controlled device in a mobile telecommunications network according to a first embodiment of the development.

FIG. 2 diagrammatically illustrates an example of the architecture of a system S for managing remotely-controlled vehicles in a communications network RC, according to one embodiment of the development.

According to this embodiment of the development, the system S comprises at least functions of the SGC system 14, which are configured to manage the connectivity between a drone 10 and its control entity 11. For a 5G network, the functions or entities of the SGC system 14 can be:

- dedicated solely to the management of drones and their control entities, such as a UAV Flight Enablement Subsystem (UFES);
- common to the management of all types of user, whether they be drones, control entities or "conventional" land-based mobile network user terminals or UEs (User Equipment), such as the equipment of the type Session Management Function (SMF), Access and Mobility Management Function (AMF), User Plane Function (UPF), and Access and Mobility Management Function (AMM), or even user profile management (subscription, rights, etc.) of the UDM (Unified Data Management) type, which stores these profiles in a Unified Data Repository (UDR).

According to the development, the system S comprises a device 100 for managing a position of a remotely controlled vehicle relative to a control entity in a communication network, said entity being able to monitor the displacement of a remotely controlled vehicle (UAV 10), referred to as a drone, said drone being controlled by a UAVC control entity 11 via a control data stream transmitted within a communication established between the UAVC control entity 11 and the drone 10 in the communication network RC. Such a management device (100) is configured to determine, for at least one given time instant, notably during the displacement of the drone, at least one distance-related parameter between the drone and the control entity and when the distance-related parameter does not lie within an interval of authorised values for a given piloting mode, apply at least one displacement restriction rule for the drone.

Figure 3:
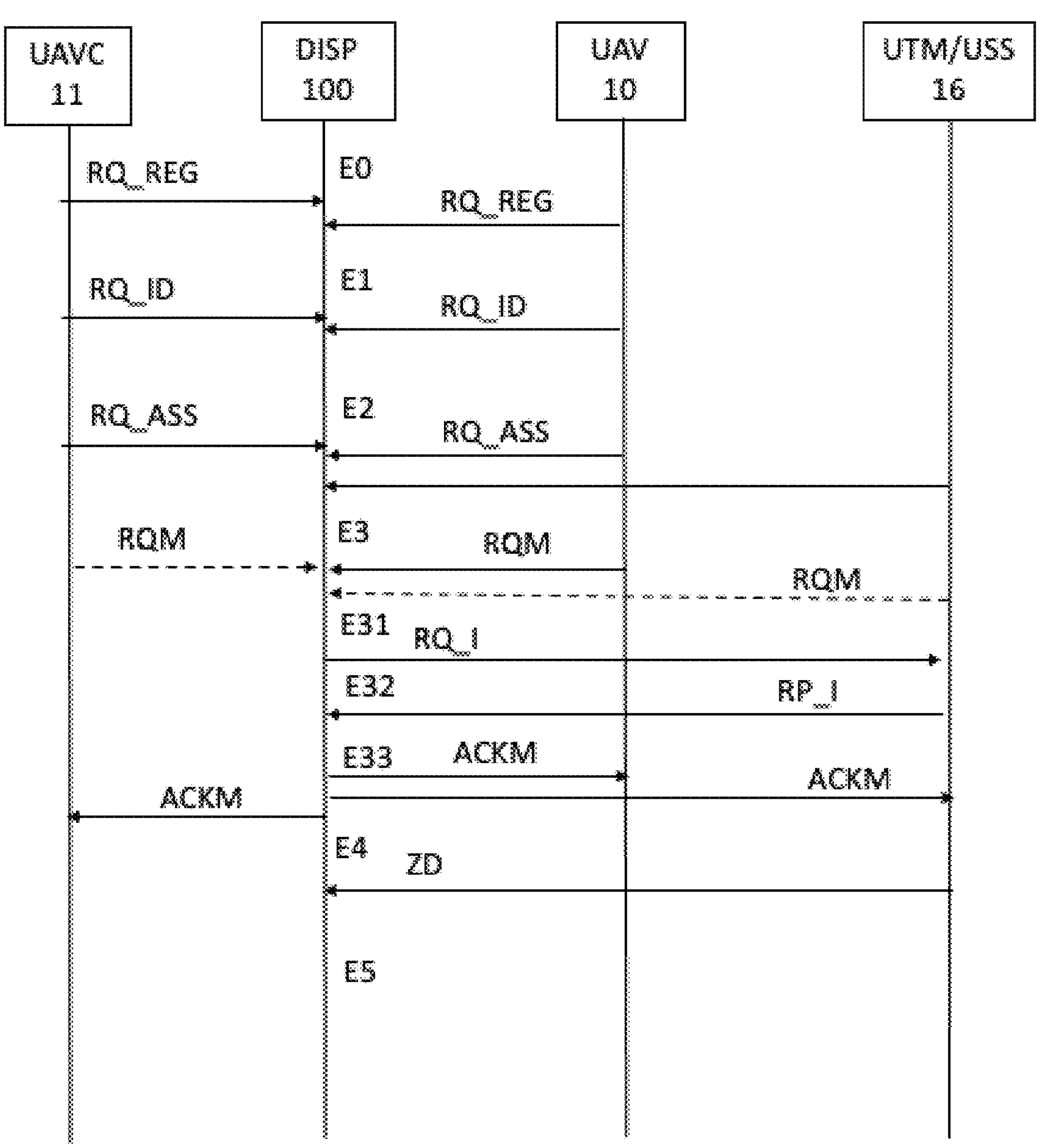
FIG. 3: this figure shows, in the form of a flow diagram, the various stages of a method for managing the position of a drone by a mobile telecommunications network, during the preparation phase for the drone's displacement.

The device 100 thus implements the method for managing a position of a drone according to the development that will be detailed hereafter in relation to FIG. 3.

In the example shown in FIG. 2, the device 100 is integrated into the SGC system 14.

Alternatively, the device 100 may be independent of the system 14, but connected to it by any link whatsoever, wired or not. The device 100 also comprises a memory M1, in which it stores, for example, the range of authorised values, a classification model of the neighbourhood of the control entity to be used for the relevant drone-control entity pair, and the restrictive measures or rules associated with the different geographical zones defined by this model. Advantageously, it comprises at least one interface E/R for communication with the network RC.

The drone management system S according to the development also includes the drone traffic management UTM/USS system 16, connected to the telecommunications network RC.

According to an alternative implementation of the development, the device 100 for managing the position of a drone relative to its control entity is integrated into the UTM/USS system 16.

The system S also comprises the remotely controlled vehicle or drone 10 and the control entity 11, which are each connected to the network RC, for example.

Thus, in a first implementation, it is assumed that the drone 10, of the "Networked drone" type, has attached itself to an item of cellular access equipment, such as the base station BS1, to the RC mobile telecommunications network. It is assumed that the control entity 11, of the "Networked UAVC" type, also attached itself to an item of cellular access equipment, such as the base station BS2, to the mobile telecommunications network RC. Without loss of generality, the base station BS2 can be the same as the base station BS1. In a second implementation, the control entity 11, of the "Cloud UAVC" type, is connected to the interconnection network DN by an item of WiFi or x-DSL access equipment, and accesses the telecommunications network RC via an entity UPF.

Whichever implementation is chosen, a first connectivity service is established between the drone 10 and the control entity 11, via the entities of the telecommunications network RC, and possibly via the entities of the network DN, and under the control of the SGC remotely-controlled systems connectivity management system 14, for example for checking authorisations.

In some cases, the transmission channel(s) established from the drone 10 can support additional communication sessions, known as data sessions, through which the drone additionally exchanges data with the control entity 11 or any other equipment with which the drone 10 needs to exchange data to fulfil its mission, for example photos, videos or data collected by sensors on-board the drone 10.

With reference to FIG. 3, the various steps of a method for managing a position of a drone with respect to its control entity according to a first embodiment of the development are now presented.

In what follows, we describe a phase preparatory to the displacement or flight of the drone, a flight phase proper and a post-landing phase (or the end of the displacement).

According to this first embodiment of the development, the management method is implemented by the device 100 integrated into the SGC system 14 for managing the connectivity of the drones of the mobile network RC.

Before the Flight

Hence, in a preliminary step E0, before the flight, the drone 10 and, according to this first embodiment, the control entity 11, are authenticated and registered (request RQ_REG) with the telecommunications network RC according to the procedures common to terrestrial users, which involve the various equipment in the access and core network (base station, AMF, UDM, etc.). The drone 10 and the control entity 11 are then registered with the SGC system 14 for managing the connectivity of remotely controlled systems. The procedures relating to these specific registrations are described in particular in document 3GPP TR 23.754.

In this implementation example, in E1, the drone 10 and the control entity are each identified and authenticated (RQ_ID request), then the two are paired in E2 (RQ_ASS request).

The control entity 11 has a control authorisation AC11 for drone 10 issued by the drone traffic management UTM/USS system 16. This control authorisation AC11 was, for example, previously received by the SGC system and stored in the item of equipment 14 in association with an identifier of the control entity 11. It may also be contained in one of the association requests received from the drone 10 and the UAVC control entity 11. This is checked in step E2.

According to the development, at E3 the device 100 obtains marking information IM for the association between the drone 10 and the control entity 11, comprising a given piloting mode, for example "VLOS". Advantageously, marking comprises recording the marking information in an entry in a data table, linked to the identifier of the drone 10 and the identifier of the control entity 11, and/or the identifier of their association. It should be noted that the IM marking of the drone 10-UAVC control entity 11 association can be "stored" in different entities: in the communication network RC, for example in the UDM or AMF and/or in the SGC system 14, for example in the UFES or an AF, and/or in the UTM/USS system 16, outside the mobile network RC. This marking information can also be part of the different blocks of information used to configure the communication channels, for example PDU sessions, the UE context block of information or the UE subscription block of information, etc.

The marking is used to identify the following situations:

- The drone manufacturer indicates that the drone 10 must absolutely be flown in VLoS mode (for example because of its weight, size, construction, battery characteristics, etc.);
- control entity 11 is not accredited to fly in BVLoS mode. It must therefore be marked in VLoS mode;
- Aviation Authorities have issued a flight ban in BVLoS mode, for example for environmental reasons (populated area, overflight zone prohibited), time slot reasons (flight during rush hour), etc.

As illustrated in FIG. 3, according to a first option, this marking information IM is obtained in a "VLOS" RQM marking request from the drone 10. For example, the drone 10 in question was not designed for BVLoS-type missions and must only operate in VLoS mode, even if its pilot is accredited for BVLoS flights. Conversely, and according to a second option, this marking information IM is obtained in a "VLOS" RQM marking request (shown in dotted lines) from the control entity 11, for example, because the pilot does not have the necessary accreditations for a BVLoS mission. According to a third option, the marking information IM is obtained in a request RQM from the UTM/USS 16 (shown in dotted lines) during the association between the drone 10 and the control entity 11, for example because the mission was declared as being of the VLOS type. According to a fourth option (not shown), the marking information IM is obtained in an RQM request from the SGC system 14 because BVLOS type missions are not authorised in the geographical zone in which the drone 10 is attached. According to a fifth option, this request comes more generally from any accredited entity, for example the security forces, which may need to take control of the drone 10 via their own drone management system, without having to go through the UTM/USS 16 used by the management entity 15.

This request RQM declares the association between drone 10 and control entity 11 as subject to the piloting mode specified by the marking information IM. For example, the marking information takes on a "VLOS" value, indicating that any flight of this drone 10 controlled by this control entity 11 is subject to the obligation to be operated in the "VLOS" direct line of sight piloting mode.

According to a particular implementation of the development, this marking request RQM is included in the association request RQ_ASS issued by the control entity 11, for example. It is therefore included in the association procedure. One advantage of grafting this marking onto the association procedure is that it reuses the message exchanges already planned between the equipment/entities involved in the association procedure. In this case, the marking is triggered by an element/function of the SGC system 14 for managing the connectivity of the remotely controlled systems itself, during the association between the drone 10 and the UAVC control entity 11 in E2, for example during the notification by the UTM drone traffic management system of the association authorisation.

In the event that it is not possible to determine which of the identifier of the drone 10 and that of the control entity 11 corresponds to the control entity, the reception of this request RQM triggers at E31 the transmission of an identification request RQ_I of the control entity to the drone traffic management UTM/USS system 16. This is the case, for example, when the SIM card inserted in the drone 10 cannot a priori be differentiated from that of a conventional UE (non-drone). A response RP_I including an identifier of the control entity would then be received at E32 and the identifier obtained for the control entity 11 is stored in memory. In another embodiment, the request RQ_I is sent both to the drone 10 and to the control entity 11, and the latter sends the response RP_I.

In a step E33, the device 100 notifies the control entity 11, the drone 10 and the drone traffic management UTM system of the effective marking of their association in "VLOS" piloting mode.

In an optional step E4, information relating to a zone ZD of displacement or overflight declared by the UAVC control entity 11 or the management entity 15 of a fleet of drones to the UTM/USS drone management system 16 is received from the UTM/USS 16 by the SGC system 14 for managing the connectivity of remotely controlled systems. This information includes, for example, a set of GPS coordinates delimiting the declared displacement zone ZD. Note that this ZD zone was previously verified and authorised by the UTM/USS system 16, which has excluded no-fly zones. The procedures relating to this step E4 are described, for example, in points 11 and 12 of document 3GPP TR 23.754.

During a step E5, a classification model MC1 of a geographical neighbourhood of the UAVC control entity 11 is obtained, for example from a memory where it is stored in association with an identifier of the control entity 11.

According to the development, this model divides the neighbourhood of the control entity into several distinct zones and associates with each of these distinct zones a set of displacement restriction measures/rules to be applied to the UAVS system (drone 10-UAVC control entity 11) during flight, as a function of the position of the drone 10 relative to its UAVC control entity 11.

Figure 4:
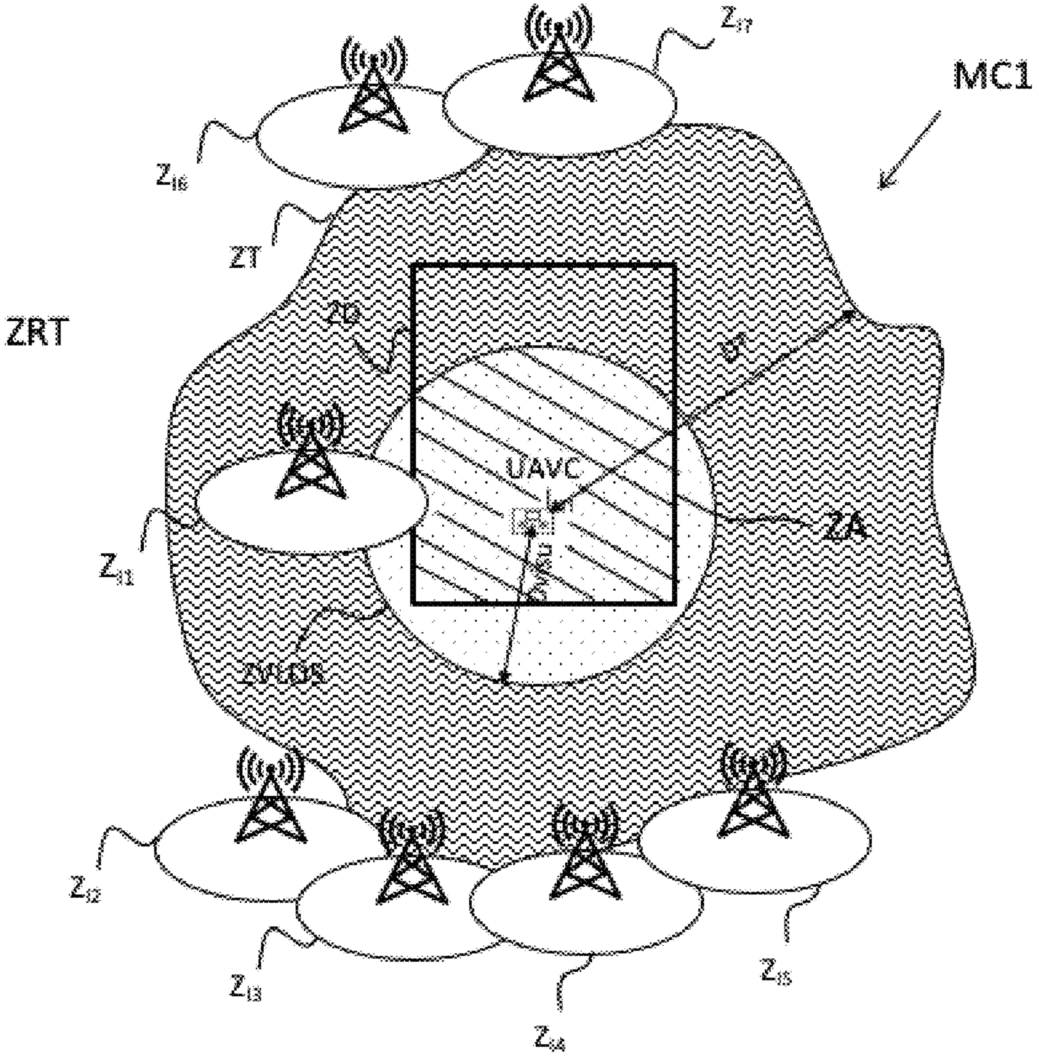
FIG. 4: this figure shows the neighbourhood classification model of a control entity in geographic zones according to one embodiment of the development.

In relation to FIG. 4, an example of an N-level classification model is shown, with N equal to 3, comprising the following classes:

a first zone $Z_{VLOS}$ is defined by the position of the UAVC and a maximum distance $D_{visu}$. This distance $D_{visu}$ corresponds to a given distance, for example set by the drone traffic management UTM system, which corresponds to the maximum distance up to which a drone is in direct line of sight with its pilot. This distance is typically set at 300 m. In the absence of a declared overflight zone ZD for the drone 10, this first zone ZVLOS constitutes an authorised zone which is not a priori subject to any flight restriction measure;

a second zone, referred to as the tolerance zone ZT (hatched with a wave pattern in FIG. 4), located around the first zone $Z_{VLOS}$ and for example defined by a set of GPS coordinates. These coordinates may, for example, correspond to a disk of radius DT, to which a greater or lesser margin of error is applied to take account of inaccuracies in the location or positioning of the base stations to which the drone 10 is attached. The tolerance radius DT can be defined by default, for example equal to the radio range of a Wi-Fi signal, typically around 1 to 2 km in open space. Within such a zone, drone 10 is necessarily at a distance from its UAVC control entity 11 which is greater than the distance $D_{visu}$. As the principle of direct line-of-sight flying is no longer respected, restrictive measures are applied. For example, a notification of an authorised zone exit alert or a new flight plan is sent to the control entity 11. The restrictions may also apply to the other communication channels relating to drone 10, resulting, for example, in the control data stream being maintained without restriction, but the payload data stream being cut off;

finally, a third zone $Z_{RT}$ zone comprising the rest of the country. Overflights are prohibited in this zone. Advantageously, one management rule is to make it impossible for the drone 10 to attach to base stations located in this zone. An associated management rule is the triggering of an emergency landing or "return home" procedure for a drone that has ventured into this zone ZT.

In the case where a displacement zone ZD has been declared in E4, it is also taken into account to define an additional zone, referred to as the authorised zone ZA, as the intersection of the first zone ZVLOS and the declared overflight zone ZD. The authorised zone ZA becomes the only zone within which drone 10 is not subject to any displacement restrictions. Similarly, in an example of implementation of the MC1 classification model, one or more zones ZI1 to ZI7 can each be defined by the coverage zone of a base station. For example, in these zones, the Agence Nationale des Fréquences ANFR has imposed a prohibition on the use of a given frequency band, and the management rule associated with these zones includes this prohibition. Restrictive measures can be incremental or additive. For example, the unrestricted authorised zone ZA is therefore defined as the intersection of the first zone ZVLOS and the declared overflight zone ZD, but excluding zones ZI1 to ZI7. Within a zone ZIi included in the zone ZA, the restrictive measures linked, for example, to the prohibition on using a given frequency band apply. The restrictive measures to be applied in the tolerance zone ZT then depend on whether the drone 10 belongs to one of the zones ZI1 to ZI7, and the restrictive measures of the two zones ZT and ZIj (j between 1 and 7) can be applied simultaneously. Finally, the restrictive measures may, for example, remain identical for the ZRT zone.

In one example of implementation of the development, the classification model used may be a default model stored in the connectivity management system 14 for remotely-controlled devices or in the device 100, AND for example limited to the 3 zones, comprising the zone $Z_{VLOS}$, the zone ZT and the zone ZRT.

In yet another example of implementation of the development, the classification model and associated rules/restrictions are declared by the pilot 11 and/or the drone traffic management UTM/USS system 16 and/or any other accredited entity. For example, this declaration is implemented via an API (Application Programming Interface). If several UAVC control entities are declared (for example: a human pilot, an autopilot, an aviation authority pilot, a BVLoS pilot, etc.), a specific classification can be defined for each pilot. In this case, the management method implements the following steps in a phase prior to the steps described above, typically when processing a flight authorisation request received by the UTM system a few days before the actual date of the flight:

the device 100 proposes a default configuration to the drone traffic management UTM/USS system 16. For example, this is a simple setting for the zone VLoS ($D_{visu}$=300 m). Here, the UTM/USS system 16 responds with a request to modify this proposal to add/delete levels or to add/delete/modify the restrictions of these levels or modify the drone management rules associated with these levels;

the system verifies the modification/addition/deletion authorisations. The requestion party may not be authorised to change certain parameters (e.g. requesting party $D_{visu}$=3 km). The possible configurations for the rules and restrictions can be proposed from a predefined list validated by the device 100. This prior validation ensures that the UTM/USS system 16 does not obtain the introduction of restrictive measures that would be technically difficult to implement for the SGC system 14 and the communication network RC;

It may involve both technical validation (certain configurations may only be available under certain conditions) and legal validation (compliance with aviation regulations), or possibly financial validation (additional cost in the case of special services, for example, a request for additional resources within the zone VLoS). The different levels (and associated rules/restrictions) can also be prioritised relative to each other. For example, compliance with aviation regulations takes precedence over additional services, such as those requiring resources specific to the drone's mission. Once validated, this classification can be defined and stored in a memory in the SGC system 14, for example in the device 100. At E54, the validated classification model MC1 is confirmed at UTM/USS 16 and control entity UAVC 11.

Once the classification model MC1 of the displacement zone has been configured, with its associated restrictions, the preparation phase ends and the drone's mission, in other words its displacement or flight, can begin.

During the Displacement or Flight

According to the development, the management method determines at different time instants during the flight a parameter relating to a distance between the drone 10 and its control entity 11 and checks that the value of this parameter belongs to an interval of values authorised for the piloting mode which marks the drone 10/control entity 11 association. This can be a single time instant if the drone is in a stationary position, for example.

In the example of FIG. 4, this distance-related parameter comprises a physical distance measurement calculated from the geographical positions of the drone 10 and its control entity 11 at a given time instant. More specifically, the device 100 performs dual tracking (in real time, periodically or on request) of the geographical positions of the UAVC control entity 11 and the drone 10 drone. From the geographical position of the UAVC control entity 11, it recalculates the zones defined by the neighbourhood classification model determined during flight preparation, and then determines in which zone the drone 10 is located, as detailed below, in relation to FIG. 5.

During a step E6, the geographical position POS_10 of the drone 10 and the position POS_11 of the UAVC control entity 11 are retrieved at a given time instant. This may take the form of a request/response exchange between the device 100 and the UAV 10/UAVC 11, a periodic transmission by the drone 10 and its control entity 11 of their positions and/or a calculation based on other geolocation solutions.

For example, the geographical positions of the drone 10, and also of its control entity 11 in the case of a networked UAVC, can be obtained using solutions 14 or 15 in the document 3GPP TR 23.754 already cited.

According to another example, the geographical positions of the drone 10 and the control entity 11, in particular for a "Cloud UAVC" type pilot, are obtained on request from the UTM/USS system 16.

At E7, the device 100 applies the classification determined at E5, by centring it on the geographical position of the control entity UAVC 11 just obtained for the given time instant, and deduces from this a delimitation of the various zones defined by this classification. In particular, it determines the boundary of the zone ZVLOS and, if an overflight zone ZD has been declared, the boundary of the authorised zone ZA, which is the intersection of the zone ZVLOS and the declared overflight zone ZD. It should be noted that the UAVC control entity 11 generally makes little or no displacement. It will therefore not be necessary to update the classification of the neighbourhood of control entity 11 each time a new geographical position is recorded.

During step E8, the management device 100 then uses the geographical position of the drone 10 to assign it to one of the zones in the classification. In the absence of a declared overflight zone ZD, it simply calculates a distance between the UAVC control entity 11 and the drone 10 to determine whether the drone is located within the authorised zone ZVLOS.

It should be noted that in this embodiment of the development, the management method can advantageously be implemented by one or more functions of the SGC system 14 configured to obtain the geographical positions of the drone 10 and its control entity 11. For example, the UAVF function described in solution #4 of the 3GPP TR 23.754 document, the UFES (UAV Flight Enablement Subsystem) equipment or entity.

When the device 100 establishes that the drone 10 is located in the zone VLOS or the authorised zone ZA, it waits for a new event that triggers a tracking of the drone 10-control entity 11 pair, for example the occurrence of a new tracking instant at the end of a given time period or the reception of a tracking request from the UTM/USS 16 or the network RC, for example when the drone 10 is attached to a new base station, or new geographical positions are obtained.

On the contrary, when it establishes that the drone 10 is not in the authorised zone ZA, the device 100 retrieves at E9 the drone management rule(s) associated by the classification model with the unauthorised zone, for example ZT or ZIj, to which the drone 10 has been assigned, and then triggers at E10 the application of the retrieved management rule.

The management rules in question may include, for example:

- sending a notification or alert to the UAVC control entity 11 and/or the UTM drone traffic management system or any other accredited entity. Such a transmission can be reiterated periodically as long as the drone UAV 10 is located in the relevant geographical zone;
- sending a new GPS destination position (or "waypoint"), a new trajectory (i.e. a set of GPS positions or several "waypoints") or a "return-to-home" message including at least the GPS position of the home or take-off point of the drone 10 or the position of the pilot 11;
- applying a prohibition on the UAV drone 10 being attached to a given set of base stations located in the geographical zone concerned;
- the sending of a command for regaining control of the UAV drone 10 by the Aviation Authorities or any other accredited entity, for example the security forces (change of pilot by implementing a transfer of control procedure);
- triggering a procedure for controlled and gradual degradation of the quality of service (QoS) of the communication established between the control entity 11 and the drone 10. Quality of service refers here to any measure of network performance or capacity to carry a stream under good conditions, generally defined in advance. For example, this could be a minimum bitrate, a latency range or a level of network availability. Compliance with a certain level of QOS is implemented by a set of technologies dedicated to controlling the allocation of network resources between different users. Quality of service management is based on quantitative measurements of performance parameters. This involves, for example, degrading the quality of the signal on the radio transmission channel established between the drone 10 and the base station to which it is attached, to mimic the characteristics of a point-to-point link (of the Wi-Fi type). Indeed, pilots are used to associating a deterioration in signal quality, for example in video control, with approaching the limits of the radio range. Advantageously, this degradation implemented by the development is a function of the calculated distance between the drone 10 and the control entity 11. For example, as this distance increases, the signal quality perceived by the UAVC control entity 11 or the drone 10 is degraded by the device 100 (e.g. degraded video control). This degradation can be achieved by various means, for example, by adding latency at the base station serving the drone 10 and/or the UAVC control entity 11, or at another item of equipment of the network RC; or by reducing the amount of radio resources allocated to the drone 10 and/or the UAVC control entity 11. In this respect, it should be noted that this voluntary deterioration may be forced by legal obligations imposed by the Aviation Authorities in terms of aviation safety. In other words, according to this example, it is not permitted to degrade the quality of service on the transmission channel beyond a certain threshold. In addition, the degradation can be applied to all the streams coming from the drone, both data streams and control streams, or to only some of these streams (for example, only the data streams or payloads), sending the drone 10 a command to switch to energy-saving mode (e.g. reducing the quality of the video stream) to penalise flying in an unauthorised zone.

It is understood that the application of these restrictive measures may require the contribution of several entities or functions of the SCG 14 system and more generally of the network RC. Some in particular may involve modifying network parameters of the communication session established between the drone 10 and the control entity 11 in the network RC. This is the case in particular for the measurement of QOS degradation, which impacts not only the base station or base stations to which the drone 10 and its control entity 11 are attached, but also possibly the network RC equipment in charge of QoS management.

Figure 6:
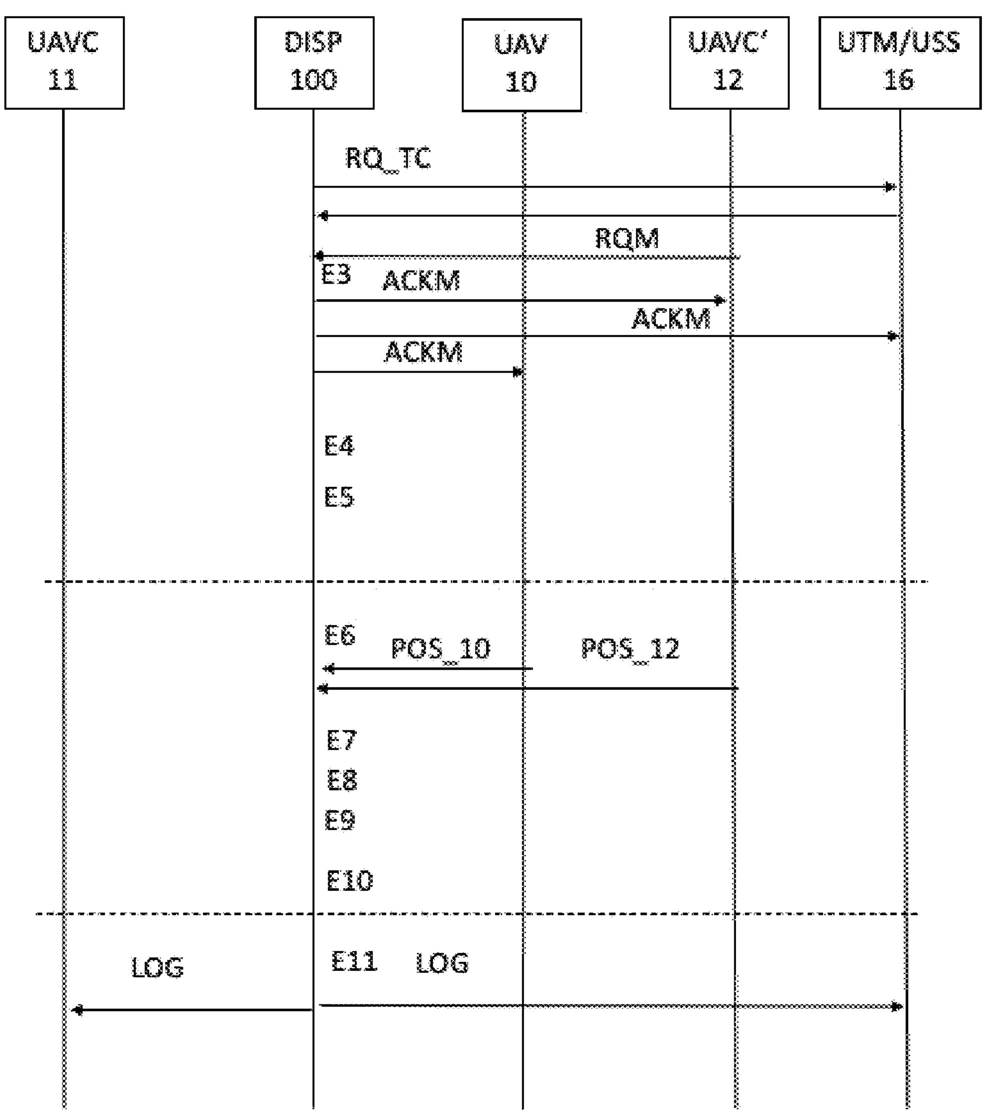
FIG. 6: this figure represents, in the form of a flow diagram, the various steps of such a method for managing the position of a drone by a mobile telecommunications network, following a transfer of control of the drone to a second control entity.

In relation to FIG. 6, it is now detailed where it is decided to transfer control of the drone 10 to a control entity other than the drone 11 control entity. For example, we find ourselves in a situation where several successive position readings have led us to determine that the drone 10 was in an unauthorised zone and the light management rules applied up to that point, such as alert notification, have not had the desired effect of making the drone 10 return to the authorised zone. Of course, the transfer of control can also be decided directly, without prior notification or other management rules. The result is that drone 10 is moving further and further away from the authorised zone ZA and has just crossed a boundary of zone ZT. This crossing constitutes an example of an event triggering a decision by the management device 100 according to the development to take control of the drone 10. It is assumed that this control entity 12 has established a PDU communication session with the SGC connectivity system 14.

Based on the principle that authorisations to control a drone are issued by the drone traffic management UTM/USS system 16, it is necessary for the control entity 12 to be previously authorised by the drone traffic management UTM/USS system 16 to control the drone 10. If necessary, a check is carried out by sending a request to the UTM system. In a variant implementation, the other control entity 12 has already been declared, for example, by the UTM via the API previously described.

According to the development, it is also necessary for the control entity to declare a classification model in advance and for it to be validated by the Aviation Authorities.

Once the authorisation has been verified with the MTU, the transfer of control is carried out by the SGC system. In particular, the association currently stored in the SGC system 14 is updated by registering a new association between the drone 12 and the other control entity 12.

Advantageously, the management method according to the development just described applies to this new UAVS system formed by the drone 10 and the control entity 12. According to the development, the new association is marked by an IM piloting mode which may be, for example, the "VLOS" mode or another piloting mode. In particular, when the second control entity is an autopilot, for example integrated into the UTM/USS system 16 or hosted in the mobile network RC, as in a MEC (Multi-access Edge Computing) type architecture where a computing service environment and computing resources are deported to the edge of the network, for example close to a base station. By its very nature, such an autopilot is not subject to direct line-of-sight steering constraints, which make no sense in this case, but rather to maximum latency constraints, which define a "LAT" steering mode and a corresponding classification model. This maximum latency, for example equal to 3 ms, is taken into account, instead of the distance $D_{visu}$, to define a first authorised zone ZLAT.

According to one implementation of the development, the transfer of control therefore triggers the modification of the classification model to be used at E5.

According to a first example, a second classification model was previously declared by the UTM/USS 16 or by any other entity accredited for the control entity 12 to the device 100 and this second model is directly taken into account instead of the first to implement the assignment of a zone to the drone 10 according to the development. As a result, the various zones are recalculated.

In this case, the change in the classification model is triggered by the transfer of control. More generally, it should be noted that according to the development, the UAV 10, the UAVC 12, the SCG system 14, the UTM/USS 16 or any other accredited entity can at any time issue a request to change the classification configuration or modify the rules/restrictions applied.

As described above, once all the preliminary checks have been successfully carried out, the SGC system connects the third communication channel of the control entity 12 to that of the drone 10 and the control entity 12 can effectively control the displacement of the drone 10.

In other words, steps E6-E10 for tracking their positions are implemented as well as the assignment of a zone to the drone 10 as a function of its position in a neighbourhood of the control entity 12 divided into zones defined by a predetermined classification model.

Steps E6 to E10 are repeated periodically, over a period which may vary from a few milliseconds to a few seconds depending on the type of displacement of the drone and the type of service supported by the drone, for example every 20 seconds for a drone with moderate displacement speed or every second for a fast-moving drone, or on request until the drone lands or is positioned, for example, in the immediate vicinity of the control entity 12.

After the Flight

Figure 5:
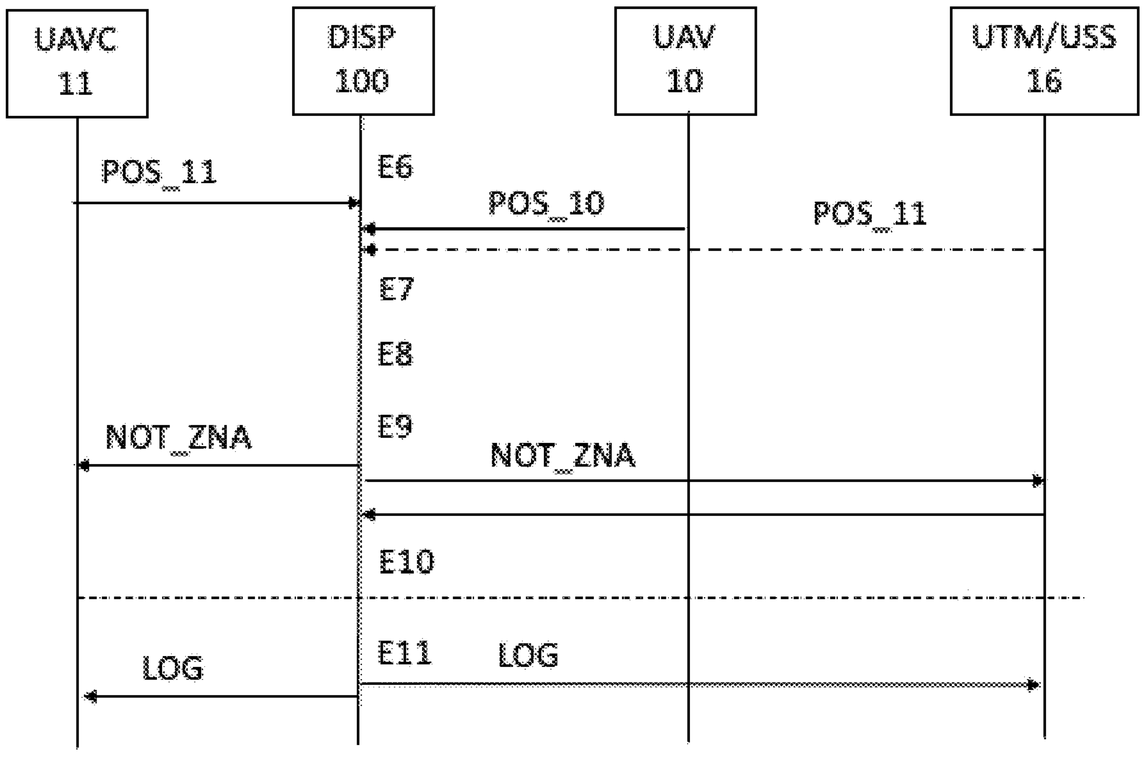
FIG. 5: this figure shows, in the form of a flow diagram, the various steps of such a method for managing the position of a drone by a mobile telecommunications network, during the displacement or flight phase.

As illustrated by FIGS. 5 and 6, during a step E11, an event report LOG is compiled by the device 100 and sent to the interested entities, such as for example the pilot or the drone operator, the UTM/USSU, the aviation authorities, etc. It includes for example the geographical positions successively recorded during the flight and the geographical zones of the classification model assigned to the drone 10 at each time instant and, where applicable, the restrictive measures decided. In this way, the various parties can keep abreast of events, and even incidents, that have occurred during the flight.

The embodiment just described in relation to FIGS. 3, 5 and 6 describes a management device 100 integrated in the SGC system 14 or in the network RC. However the development is not limited to this example. Alternatively, the device 100 can be integrated into the drone traffic management UTM/USS system 16, which is connected to the mobile network RC and interacts with the SGC system 14. In this case, the geographical positions of the drone 10 and of the control entity 11 can be obtained from the SGC system 14, from the network RC, but the determination of the distance measurement, the verification based on this distance that the drone is flying in an authorised zone and, if this is not the case, the sending to the network RC of requests requesting the implementation of drone management rules, are implemented in the UTM/USS system 16.

Figure 7:
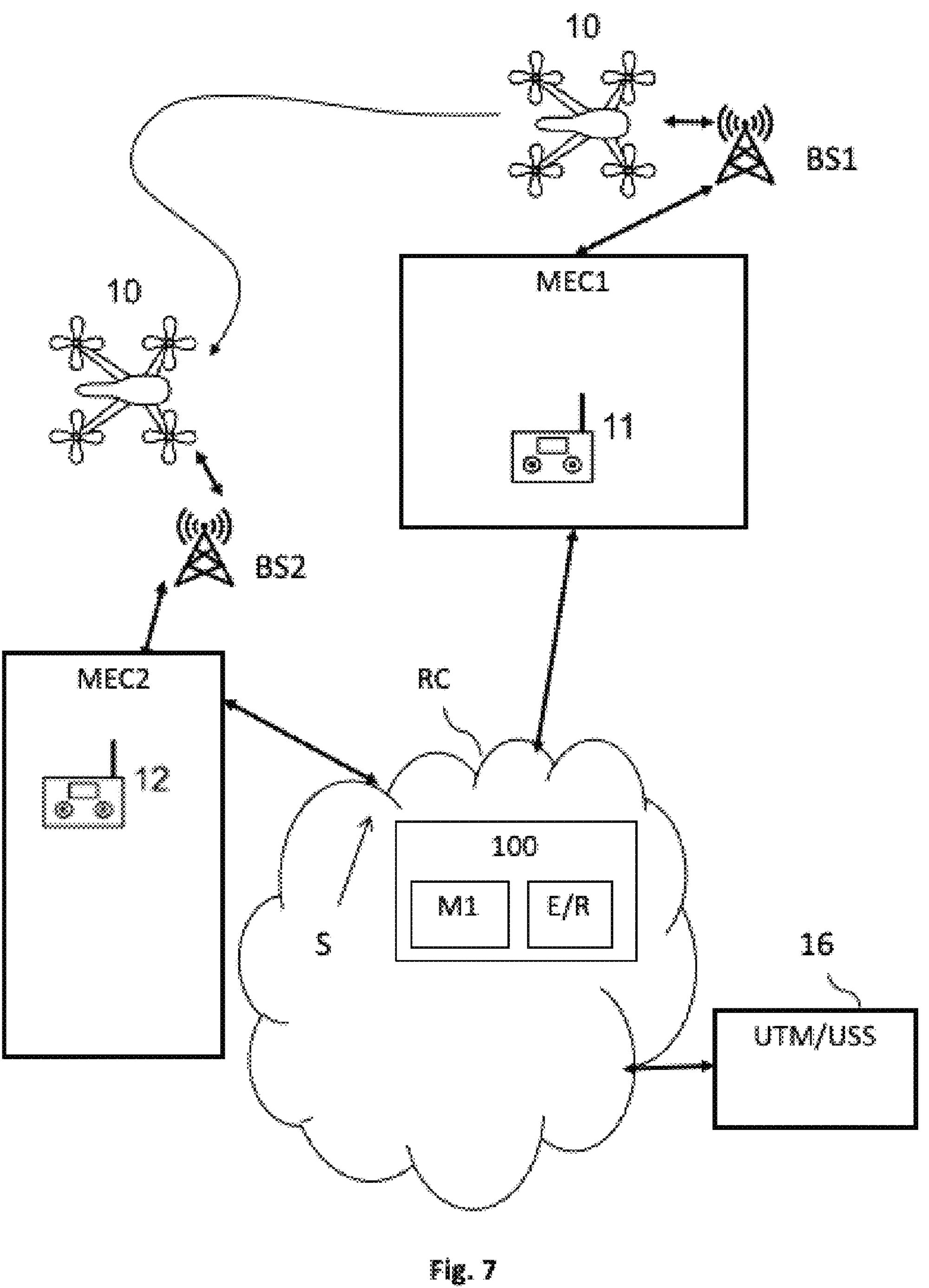
FIG. 7: this figure shows an illustrative example of the architecture of a system for managing a remotely-controlled device in a mobile telecommunications network according to a second embodiment of the development.

In relation to FIG. 7, another embodiment of the development, according to which the control entity 11 is an autopilot 11 integrated into the network RC, for example using a Multi-access Edge Computing (MEC) architecture is now presented. An example of this is a drone delivery service for products to end consumers. The control entity/autopilot 11 is housed in an MEC1 unit located close to the BS1 base station, for example on the same physical site. This MEC1 entity is configured to provide network clients, in this case a delivery company, with a cloud-type environment, as well as significant computing and analysis resources enabling the execution of various services, in this case the automatic piloting of drone 10 according to the management rules of the delivery company's drone fleet. The fact that the autopilot is integrated into the MEC1 entity means that it benefits from much lower latency than if the computing environment and resources were located in a centralised cloud, for example physically hosted at the delivery company's head office.

According to this example, the device 100 for managing the UAVS drone 10-autopilot 11 system is, for example, integrated into the network RC, within the SGC system 14. Steps E0-E11 previously described apply.

It is assumed that an overflight zone ZD has previously been declared to the UTM/USS 16 as a function of the delivery address(es) of the product(s) transported by the drone 10. It is also assumed that the association between drone 10 and autopilot 11 is marked using the "LAT" piloting mode described above.

Advantageously, according to this second embodiment, two distinct distance parameters can be taken into account and determined at E6. The first corresponds to the physical distance measurement described above, based on double tracking of the UAVS system's geographical positions during the flight and calculated at each new position reading, to check that the drone 10 does not leave the declared overflight zone ZD. The second is a measure of the latency of the stream of control data in the communication between the drone 10 and the autopilot 11 or between the drone 10 and an item of network RC equipment. This latency measurement is used to check that the drone 10 does not leave the first ZLAT zone for which the latency is less than a threshold ThLat equal to 3 ms, for example. It can be measured, for example, by the autopilot directly, or by equipment in the item of network equipment RC. Advantageously, it is obtained several times during the flight, regularly or not, at the request of the device 100 or the SGC system 14, or not. Indeed, latency is likely to increase the further the drone 10 is from the BS1 base station or when the drone 10 detaches from the BS1 base station to attach to the base station BS2 (due in particular to the network topology, the control stream may pass through more network equipment, which may increase latency).

It is understood that in this case, the positioning of the autopilot 11 in the MEC1 entity becomes less relevant, in particular in relation to the interest of deploying an autopilot as close as possible to the access station to which the drone 10 connects in order to reduce latency in particular, and the control it exercises over the drone 10 is therefore less effective. When the latency measured at a given moment exceeds the given threshold value ThLat, it is decided to transfer control of the drone 10 to a second autopilot 12 located in an MEC2 entity in the immediate vicinity of the base station BS2, closer to the drone 10. The effect of this action will be to reduce latency significantly and therefore improve the quality of communication between the drone and the autopilot 12 and thus ensure that the mission of the drone 10 is carried out under optimum safety and control conditions. This transfer of control from drone 10 to a second autopilot 12 can also be triggered by changing the base station association (handover) of drone 10.

Figure 8:
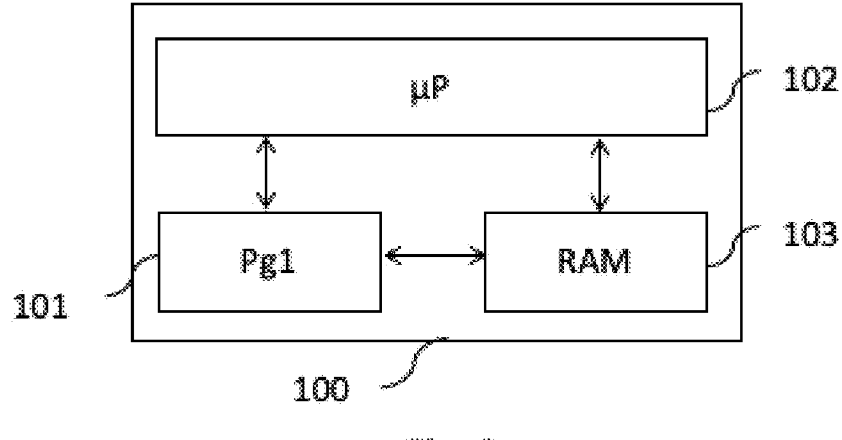
FIG. 8: this figure diagrammatically shows an example of a hardware structure of a device for managing the position of a remotely-controlled device according to an embodiment of the development.

In relation to FIG. 8, an example of the hardware structure of a device 100 for managing a position of a remotely-controlled vehicle, referred to a drone, in relation to a control entity, said control entity being configured to control the drone by means of a stream of control data transmitted indirectly within a communication established between the control entity and the drone by means of a communication network, said device comprising a module for determining at least one distance-related parameter between the drone and the control entity and a module for applying at least one rule for managing the drone. Advantageously, the device 100 also comprises a module for obtaining a geographical position of the drone and a geographical position of the control entity, a module for obtaining a classification model of a neighbourhood of the control entity associated with the given piloting mode, said model comprising at least a first zone, referred to as the authorised displacement zone, defined by said interval of values of the parameter and a second, non-authorised displacement zone, complementary to the first. It may also include a module for obtaining the given piloting mode and storing said piloting mode in memory for association between an identifier of the drone and an identifier of the control entity in said network. It can also include a module for obtaining an event report and a module for transmitting said report to an accredited entity and/or to the control entity.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 100 comprises a random access memory 103 (a RAM memory, for example), a processing unit 102 equipped for example with a processor and controlled by a computer program Pg1, representative of the above mentioned modules, stored in a read-only memory 101 (a ROM memory or hard disk, for example). At initialisation, the code instructions of the computer program are for example loaded into a random access memory 103 before being executed by the processor of the processing unit 102. The random access memory 103 may also contain, for example, the item of validation information of the second quality of service level, the item of identification information of the item of server equipment, etc.

FIG. 8 only shows a particular one of several possible ways of realising the device 100, so that it executes the steps of the method for managing a position of a drone as detailed above, in relation to FIGS. 3, 5, 6 and 7 in its various embodiments. Indeed, these steps may be implemented either on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, an SD card, a USB flash drive, CD-ROM or DVD-ROM) or non-removable storage medium, this storage medium being partially or totally readable by a computer or a processor.

The various embodiments have been described above in relation to a device 100 implemented in one or more network functions of the telecommunications network RC, such as for example a UFES entity or a dedicated AF application function of an SGC system 14 for managing the connectivity of remotely-controlled devices implemented in a mobile network. Naturally, the development is not limited to these examples.

The development just described has many advantages. It proposes to implement, in a mobile telecommunications network, a solution for managing the relative position of a drone relative to its control entity, which is secure and efficient. In particular, it relies on dual tracking of the geographical positions of the drone and its control entity to check regularly that the drone is not straying too far from its pilot in relation to previously established rules, to react if an unauthorised limit is crossed and to inform the aviation authorities in real time. It can also take into account measures other than a physical distance between the drone and its pilot, such as a measure of latency in the stream of control data exchanged between them via the communications network, and trigger the application of appropriate management rules when this latency measure exceeds a given threshold.

The invention claimed is:

1. A method of managing a position of a remotely-controlled vehicle, referred to as a drone, relative to a control entity, the control entity being configured to control the drone by means of a stream of control data transmitted indirectly within a communication established between the control entity and the drone via a communication network, wherein the method is intended to be implemented in at least one entity of the communication network or at least one entity of a drone connectivity management system of the communication network, the entity being distinct from the drone, and wherein the method comprises:

for at least one time instant of the communication, determining at least one parameter relating to a distance between the drone and the control entity; and when the distance-related parameter does not lie within an interval of authorised values for a given piloting mode, applying at least one management rule for the drone.

2. The management method according to claim 1, wherein the method further comprises obtaining a geographical position of the drone and a geographical position of the control entity, in that the parameter comprises at least one physical distance measurement between the drone and the control entity determined from the geographical positions and in that the at least one management rule is applied when the distance measurement exceeds a maximum authorised distance.

3. The management method according to claim 1, wherein the parameter relating to a distance comprises at least one latency measurement of the communication established between the drone and the control entity and in that the at least one drone management rule is applied when the latency measurement is greater than a maximum latency value.

4. The management method according to claim 1, wherein the method comprises first obtaining a classification model of a neighbourhood of the control entity associated with the given piloting mode, the model comprising at least a first zone, called an authorised displacement zone, defined by the interval of values of the parameter, and a second non-authorised displacement zone, complementary to the first, and in that the at least one drone management rule is applied when the drone leaves the authorised displacement zone.

5. The management method according to claim 4, wherein the method comprises obtaining information relating to a declared displacement zone for the drone and in that the authorised displacement zone is adapted according to the declared displacement zone, the at least one drone management rule being applied when the drone leaves the authorised displacement zone or the declared zone.

6. The management method according to claim 4, wherein the at least one management rule comprises the transmission of an order prohibiting attachment of the drone to at least one item of access equipment located within radio range of the unauthorised zone.

7. The management method according to claim 4, wherein the at least one drone management rule comprises transmission to at least one item of access equipment located within radio range of the unauthorised geographical zone, of an order of degradation of a signal quality between the drone and the at least one item of access equipment of the network.

8. The management method according to claim 1, wherein the method comprises obtaining the given piloting mode beforehand, the piloting mode being stored in memory for an association between the drone and the control entity in the network.

9. The management method according to claim 1, wherein the at least one drone management rule belongs to a group comprising at least the sending to the control entity of a notification relating to:

a warning that the drone has left at least the authorised flight zone;

a command to return to the authorised flight zone;

a flight plan to the authorised flight zone; and a notification that control of the drone has been transferred to a second control entity.

10. The management method according to claim 1, wherein the at least one drone management rule comprises triggering a transfer of control of the drone to a second authorised control entity.

11. The management method according to claim 10, wherein the transfer of control of the drone to the second control entity triggers an update of the piloting mode, the authorised interval of values and the at least one drone management rule.

12. The management method according to claim 1, wherein the method comprises obtaining an event report and transmitting the report to an accredited entity and/or to the control entity.

13. A processing circuit comprising a processor and a memory, the memory storing program code instructions of a computer program to execute the management method according to claim 1, when the computer program is executed by the processor.

14. A device for managing a position of a remotely-controlled vehicle, referred to as a drone, relative to a control entity, the control entity being configured to control the drone by means of a stream of control data transmitted indirectly within a communication established between the control entity and the drone via a communication network, wherein the device is configured to implement in at least one entity of the communication network or at least one entity of a system for managing the connectivity of the communication network's drones, the entity being distinct from the drone:

for at least one time instant of the communication, determine at least one parameter relating to a distance between the drone and the control entity; and when the distance-related parameter does not lie within an interval of authorised values for a given piloting mode, apply at least one management rule for the drone.

15. A system for managing a position of a remotely controlled vehicle, referred to as a drone, relative to a control entity configured to control the drone via a communication established in a telecommunications network, wherein the system comprises a drone connectivity management system integrated into the network, a drone traffic management system connected to the network and the management device according to claim 14.

* * * * *